(12) United States Patent
Halsmer

(10) Patent No.: US 9,731,419 B2
(45) Date of Patent: Aug. 15, 2017

(54) SYSTEM AND METHOD FOR PROGRAMMING ROBOTS

(75) Inventor: Matthew Halsmer, Brownsburg, IN (US)

(73) Assignee: PRAXAIR S.T. TECHNOLOGY, INC., North Haven, CT (US)

( * ) Notice: Subject to any disclaimer, the term of this patent is extended or adjusted under 35 U.S.C. 154(b) by 1422 days.

(21) Appl. No.: 13/080,696

(22) Filed: Apr. 6, 2011

(65) Prior Publication Data

US 2012/0123590 A1    May 17, 2012

Related U.S. Application Data

(60) Provisional application No. 61/370,312, filed on Aug. 3, 2010.

(51) Int. Cl.
| | | |
|---|---|---|
| G05B 15/00 | (2006.01) | |
| G05B 19/00 | (2006.01) | |
| B25J 9/16 | (2006.01) | |
| G05B 19/423 | (2006.01) | |

(52) U.S. Cl.
CPC .......... *B25J 9/1656* (2013.01); *G05B 19/423* (2013.01); *G05B 2219/36451* (2013.01)

(58) Field of Classification Search
CPC ............................... G05B 14/42; B25J 9/0087
USPC ....................................................... 700/264
See application file for complete search history.

(56) References Cited

U.S. PATENT DOCUMENTS

| | | |
|---|---|---|
| 3,920,972 A | 11/1975 | Corwin, Jr. et al. |
| 4,105,937 A | 8/1978 | Tuda et al. |
| 4,803,640 A | 2/1989 | Mitomi et al. |
| 4,998,050 A | 3/1991 | Nishiyama et al. |
| 5,495,410 A | 2/1996 | Graf |
| 5,600,759 A * | 2/1997 | Karakama ..................... 700/252 |
| 5,880,956 A | 3/1999 | Graf |

(Continued)

FOREIGN PATENT DOCUMENTS

| | | |
|---|---|---|
| JP | 61-208515 | 9/1986 |
| JP | 3-135464 | 6/1991 |
| JP | 2001-51713 | 2/2001 |

OTHER PUBLICATIONS

C. A. Acosta-Calderon and H. Hu; Robot imitation: Body schema and body percept; ABBI 2005, vol. 2, No. 3-4, pp. 131-148.

*Primary Examiner* — Harry Oh
(74) *Attorney, Agent, or Firm* — Nilay S. Dalal

(57) ABSTRACT

This invention relates to a robot programming method that is carried out at a first location (i.e., teaching station) and a second location (i.e., application station). The second location is different from the first location. At the first location, teach data is prepared to teach motions to a robot to drive an end effector through a series of desired path points along a desired path of motion with respect to the application station. The teach data comprises at least one of robot position data elements and at least one of robot motion pattern data elements. At the second location, teach data is communicated to the robot and the robot is programmed in accordance with the teach data to drive the end effector through the series of desired path points along the desired path of motion with respect to the application station. This invention also relates to a robot programming system. The robot programming method and system are useful, for example, in thermal spray coating applications.

14 Claims, 5 Drawing Sheets

(56) References Cited

U.S. PATENT DOCUMENTS

| | | | |
|---|---|---|---|
| 6,292,715 B1* | 9/2001 | Rongo | 700/249 |
| 6,606,539 B2* | 8/2003 | Raab | 700/245 |
| 6,684,128 B1* | 1/2004 | Tounai et al. | 700/245 |
| 6,928,337 B2* | 8/2005 | Watanabe et al. | 700/245 |
| 7,248,012 B2* | 7/2007 | Takahashi et al. | 318/568.13 |
| 2005/0107920 A1* | 5/2005 | Ban et al. | 700/245 |
| 2006/0259195 A1* | 11/2006 | Eliuk et al. | 700/245 |

* cited by examiner

SYSTEM AND METHOD FOR PROGRAMMING ROBOTS

CROSS REFERENCE TO RELATED APPLICATIONS

This application claims priority to U.S. provisional patent application Ser. No. 61/370,312 filed Aug. 3, 2010, the disclosure of which is incorporated by reference.

FIELD OF THE INVENTION

This invention relates to systems and methods for programming robots and other computer-controlled multi-axis manipulator systems. In particular, this invention involves robot programming systems and methods for industrial robots and robot simulators at different locations including, for example, off-line robot programming with a teach arm.

BACKGROUND OF THE INVENTION

Robot and other multi-axis manipulator systems are used in an increasing number of industrial and commercial applications to perform precise and repetitive movements with a minimum of human intervention. For example, robots are used to apply spray paint to automobile door panels, to weld components together, and the like. Properly programmed robots are highly repeatable and reliable.

Robot systems typically include a robot and a computer-based controller. Commonly used six-axis industrial robots include an arm assembly having one end mounted to a base, and a wrist on the opposite end. A grasping mechanism configured to receive the tool or other workpiece to be moved by the robot is mounted to the wrist. The grasping mechanism and workpiece, or whatever devices are mounted to the robot wrist, are together known generally as an end effector. The computer-based robot system controller is programmed with a robot drive program. When executed by the controller, motion-control program segments of the drive program cause the robot arm assembly and wrist to drive the end effector through a predetermined or desired path of motion with respect to a workstation.

The robot system controller must be programmed with the motion-control program segments. A number of known programming techniques are typically used for this purpose, including the teach pendant, lead-through, kinematic model and computer simulation methods.

There are disadvantages with each of these known programming techniques. For example, the teach pendant programming method can be relatively slow and inefficient. Because it is performed on-line with the actual robot to be programmed, the teach pendant programming method results in robot down time and associated productivity losses. The lead-through programming methods require a technician to be in close proximity to the robot, so they are typically not used with heavy or high-powered robots. The kinematic programming methods are robot specific and require a separate arm for each type of robot being programmed. The computer simulation programming methods can be slow and inefficient to use. It is also difficult to accurately program a robot to move about a desired three-dimensional path using this method.

There is a continuing need for improved robot programming systems. In particular, there is a need for improved programming methods that minimize the amount of robot down time and associated lost productivity. The robot programming methods should be capable of efficiently and accurately generating and optimizing motion-control programs. Programming methods of this type capable of efficiently and accurately generating path-synchronized data would also be useful.

SUMMARY OF THE INVENTION

This invention relates in part to a robot programming method comprising: (i) at a first location comprising a teaching station, preparing teach data to teach motions to a robot to drive an end effector through a series of desired path points along a desired path of motion with respect to an application station, said teach data comprising at least one of robot position data elements and at least one of robot motion pattern data elements; and (ii) at a second location comprising said application station, said second location being different from said first location, communicating said teach data to said robot and programming said robot in accordance with said teach data to drive said end effector through said series of desired path points along said desired path of motion with respect to said application station.

The robot programming/controlling methods and systems of this invention, particularly, the off-line robot programming with a teach arm, minimize the amount of robot down time and associated lost productivity. The robot programming methods can efficiently and accurately generate and optimize motion-control programs. Also, the robot programming methods can efficiently and accurately generate path-synchronized data.

BRIEF DESCRIPTION OF THE DRAWINGS

The following more detailed description of the present system and method for programming robots is more fully understood with reference to the following drawings in which:

FIGS. 4a and 4b depict an Auto Raster implementation scheme while

DETAILED DESCRIPTION OF THE INVENTION

As indicated above, this invention relates to a robot programming/controlling method that is carried out at a first location (i.e., a teaching station) and a second location (i.e., an application or work station). The second location is different from the first location. At the first location, teach data is prepared to teach motions to a robot to drive an end effector through a series of desired path points along a desired path of motion with respect to the application or workstation. The teach data comprises at least one of robot position data elements and at least one of robot motion pattern data elements. At the second location, teach data is communicated or commanded to the robot and the robot is programmed/controlled in accordance with the teach data to drive the end effector through the series of desired path points along the desired path of motion with respect to the application or workstation.

The robot programming/controlling method utilizes the first location as a teaching station and the second location as an application station. In an embodiment, the first location is used to simulate thermal spray coating a workpiece and the second location is used to thermal spray coat the workpiece.

The teaching station includes a teach arm and a table having a fixture plate. The teaching station fixture plate can be rotated about one or more axes. The teaching station fixture plate has at least one degree of freedom. The teach arm is used to detect one or more features on the teaching station fixture plate and to determine rotation angle of the teaching station fixture plate. In particular, the teach arm is used to determine rotation angle of the teaching station fixture plate by detecting a known feature on the teaching station fixture plate and comparing it to calibration data.

The application station includes a robot and a device having a fixture plate. The application station fixture plate can be tilted and/or rotated. The application station fixture plate has at least one degree of freedom. An algorithm can be used to solve for application station fixture plate tilt and/or rotation angles. In an embodiment, the teaching station fixture plate and the application station fixture plate are the same.

Figure 1:
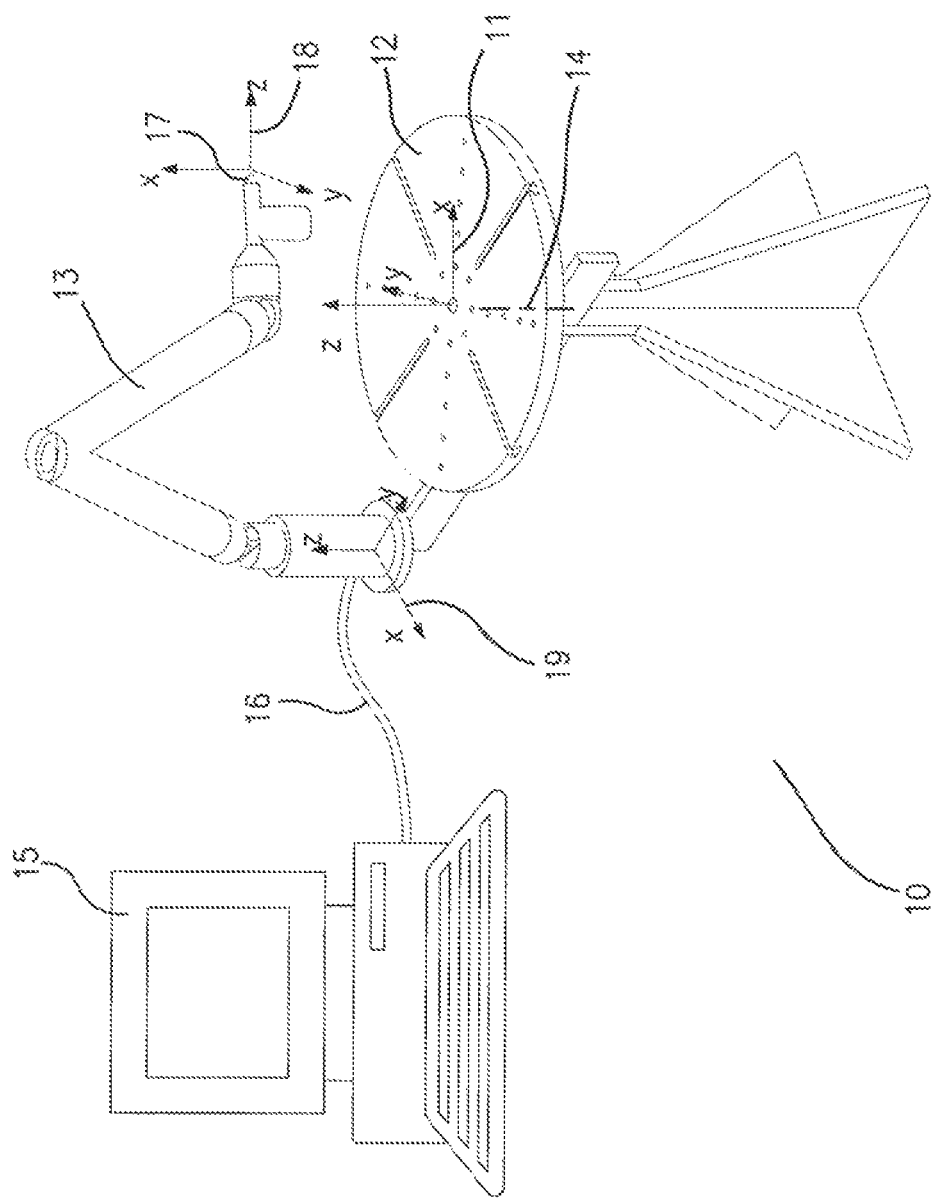
FIG. 1 depicts an illustrative teaching station that includes a teach arm and a table having a fixture plate.

Referring to FIG. 1, the teaching station 10 includes a teach arm 13 and a table having a fixture plate 12. The teaching station fixture plate 12 can be rotated about one or more axes. The fixture plate 12 has a fixture plate coordinate system 11 (x, y, z) and a vertical axis of rotation 14. The teach arm 13 includes a teach arm coordinate system 19 (x, y, z) and a teach arm probe 17. The teach arm probe 17 has a teach arm probe coordinate system 18 (x, y, z). The teach station 10 can be connected to a computer 15 through a link 16 from the teach arm 13 to the computer 15.

Figure 2:
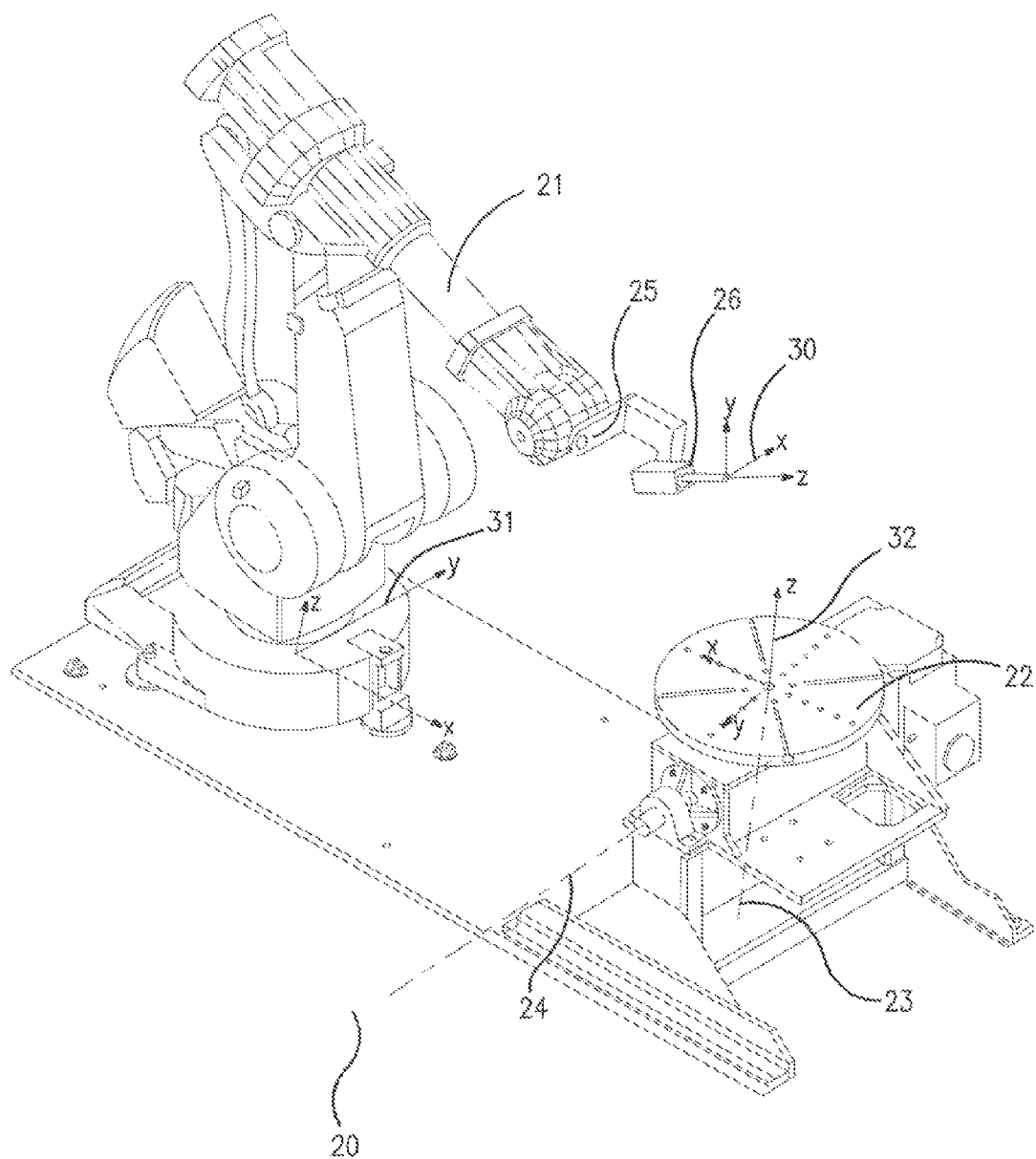
FIG. 2 depicts an illustrative application station that includes a robot and a device having a fixture plate.

Referring to FIG. 2, the application station 20 includes a robot/manipulator 21 and a device having a fixture plate 22. The application station fixture plate 22 can be tilted on a tilt axis 24 and/or rotated on a rotate axis 23. The fixture plate 22 has a fixture plate coordinate system 32 (x, y, z). The robot/manipulator 21 has an end effector mount 25 and an end effector/thermal spray torch 26. The end effector/thermal spray torch 26 has an end effector/thermal spray torch coordinate system 30 (x, y, z). The robot/manipulator 21 has a robot/manipulator coordinate system 31 (x, y, z).

The teach data can be categorized into routines for driving the end effector through a series of desired path points along a desired path of motion with respect to the application or workstation. The teach data includes at least one of robot position data elements and at least one of robot motion pattern data elements. The routines include one or more chapters in which data is recorded in small segments for playback at a fixed application station fixture plate tilt and rotation angle. Each chapter can have a different application station fixture plate tilt and rotation angle. Data is recorded in said chapters for playback with speed scaling.

In the robot programming method of this invention, raw data is generated to teach motions to a robot to drive an end effector through a series of desired path points along a desired path of motion with respect to an application station. Several methods of data generation have been developed, for example, Mimic, Point Select, and Auto Raster.

Mimic involves recording the position and orientation of the teach arm at small equivalent time intervals (about 100 ms) such that speed can additionally be inferred. This mode allows the operator to impart not only position and orientation information to the offline programming tool, but additionally speed through a natural acting out of the desired motion. This enables portions of the same record segment to be replayed at various desired speeds with minimal interaction of the operator and the programming computer. Using the Mimic method could be enhanced by adding a speed scaling command where the whole segment could be recorded by the operator at a slower rate than the desired replay to enable more precision imparted by the operator. Then with on simple post processing of adjusting a multiplier, the desired speeds can be managed.

Point Select is another data gathering method for teaching the data which involves selecting positions in space in sequence for which it is desired that the robot jogs linearly between in the same sequence. The speed command for this type of method would likely be set uniformly for the entire segment of the program, but it is feasible to make it a different speed for each move between points.

Auto Raster can be implemented a number of ways but effectively covers the notion of selecting a few points that define a plane across which a path is generated that draws a line, steps down along the plane by the step width and then draws a line the opposite direction, with continued stepping down the plane until the plane has been covered as desired. As shown in FIG. 4, one implementation of this is to select three points (p1, p2, p3) and a step width (sw) where it is desired for the end-effector of the robot to start by going to p1, then move linearly to p2, then step down by sw perpendicular to the line between p1 and p2 in the general direction of p3. Then go back across the plane (defined by p1, p2, & p3) until just below p1 (by the distance sw), where another step down by distance sw would occur in the planar direction of p3 and the criss-crossing of lines would continue until the line just succeeding p3 was reached.

Another Auto Raster implementation is to define 2 points (p1 & p2), record a sweep motion similar to Mimic with motion generally orthogonal to the line between p1 and p2, and define a step down (sw). The mimicked motion (speed, position & orientation change and all) could then be replayed with a start movement that would include the point p1, and then traverse down a distance sw toward p2 with the mimicked motion in reverse played (as its going the opposite direction). This would criss-cross the region similar to the previous method until the point p2 was reached.

With regard to coordinate system transfer background math, it is convenient to represent a coordinate system transformation with a matrix. The form of the matrix used is a 4×4 where the upper left 3×3 captures the orientation and the upper right 3×1 captures position. The bottom row will always be [0 0 0 1] and can be ignored as it is only there to enable some of the mathematical features necessary for manipulation.

$$[T] = \begin{bmatrix} [\ R_{3\times3}\ ] & P_{3\times1} \\ 0\ \ 0\ \ 0 & 1 \end{bmatrix}$$

$$R_{3\times3} = \begin{bmatrix} x_i & y_i & z_i \\ x_j & y_j & z_j \\ x_k & y_k & z_k \end{bmatrix} \quad P_{3\times1} = \begin{bmatrix} Dx \\ Dy \\ Dz \end{bmatrix}$$

Figure 4A:
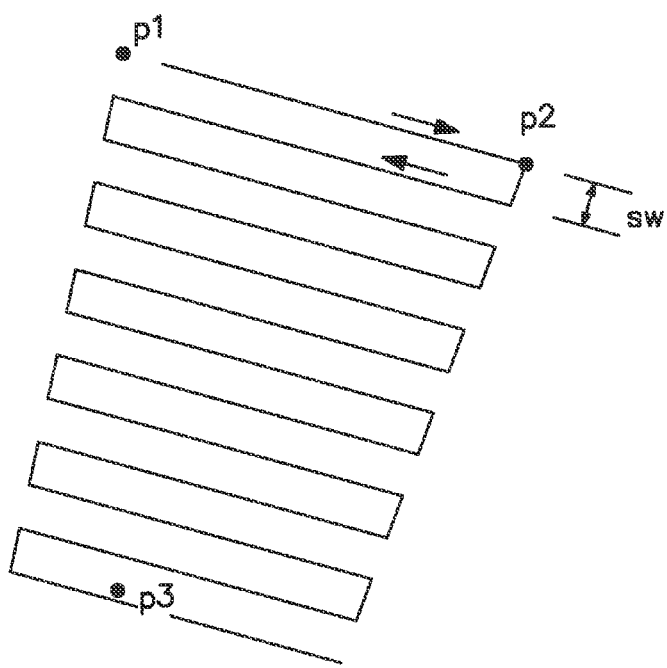
Figure 4B:
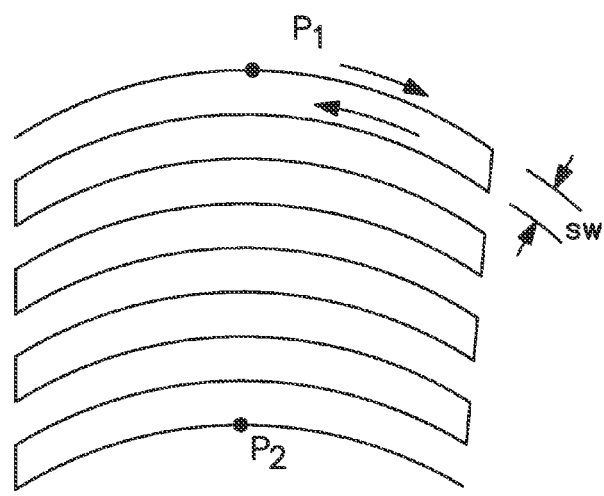
Figure 4C:
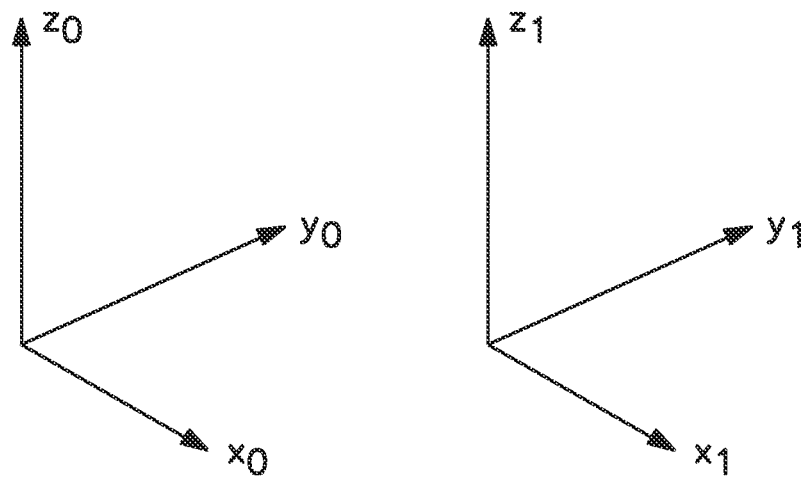
FIGS. 4c and 4d depict translations of a coordinate system.

The position vector is fairly straightforward. The values in these places indicated the translation shift of the coordinate system origin along the base coordinate system axes in millimeters. FIG. 4c shows the translation of a coordinate system. A reasonable value for the P vector would be:

x=3 mm, y=4 mm, z=0

Figure 4D:
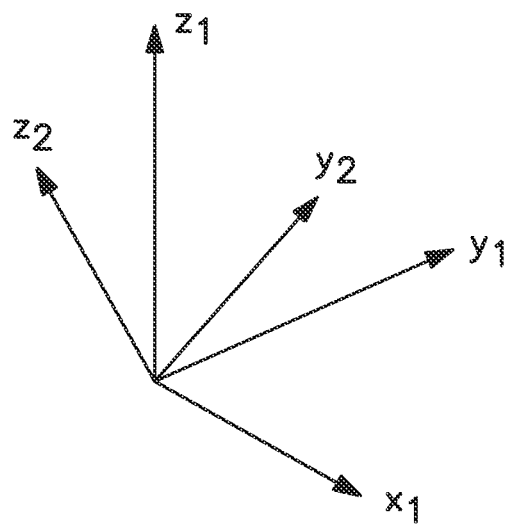

The value of the parameters of the rotation submatrix will always be between −1 and 1. It is most convenient to think of them as a unit vectors indicating the percentage along the original coordinate system axes. FIG. 4d shows a new coordinate system rotated by 30 degrees about the X axis of the old coordinate system. Since the x axis of the new coordinate system is aligned with the x axis of the old system, then the 'x unit vector' would have the following values:

$x_i=1$, while $x_j=x_k=0$

This makes sense as it is 100% along the x-axis and 0% along the other two. The new y axis has no x component and is mostly y but some z. This would yield the following values:

$y_i=0$; $y_j=0.866=\cos(30\ \deg)$; $y_k=0.5=\sin(30\ \deg)$

Finally the values of z would be as follows:

$z_i=0$; $z_j=-0.5=-\sin(30\ \deg)$; $z_k=0.866=\cos(30\ \deg)$

Note how $z_j$ is negative which can be clearly seen in FIG. 4d.

So the transformation matrix which represents a coordinate system change has two aspects: translation and orientation. The following show matrix representations of the overall transform for FIGS. 4c and 4d.

$$\text{From Fig. } 4c \rightarrow T_{01} = \begin{bmatrix} 1 & 0 & 0 & 3 \\ 0 & 1 & 0 & 4 \\ 0 & 0 & 1 & 0 \\ 0 & 0 & 0 & 1 \end{bmatrix}$$

$$\text{From Fig. } 4d \rightarrow T_{12} = \begin{bmatrix} 1 & 0 & 0 & 0 \\ 0 & 0.866 & -0.500 & 0 \\ 0 & 0.500 & 0.866 & 0 \\ 0 & 0 & 0 & 1 \end{bmatrix}$$

Image the coordinate system first translated (as shown in FIG. 4c) and then rotated (as shown in FIG. 4d). The resulting matrix can be found by multiplying the two matrices together following matrix math principles. This appears as follows:

$$T_{02} = T_{01} * T_{02} =$$

$$\begin{bmatrix} 1 & 0 & 0 & 3 \\ 0 & 1 & 0 & 4 \\ 0 & 0 & 1 & 0 \\ 0 & 0 & 0 & 1 \end{bmatrix} * \begin{bmatrix} 1 & 0 & 0 & 0 \\ 0 & 0.866 & -0.500 & 0 \\ 0 & 0.500 & 0.866 & 0 \\ 0 & 0 & 0 & 1 \end{bmatrix} = \begin{bmatrix} 1 & 0 & 0 & 3 \\ 0 & 0.866 & -0.500 & 4 \\ 0 & 0.500 & 0.866 & 0 \\ 0 & 0 & 0 & 1 \end{bmatrix}$$

This is different than if the rotation had taken place first and then the translation. Matrix multiplication is order dependent unlike scalar math.

$$\begin{bmatrix} 1 & 0 & 0 & 0 \\ 0 & 0.866 & -0.500 & 0 \\ 0 & 0.500 & 0.866 & 0 \\ 0 & 0 & 0 & 1 \end{bmatrix} * \begin{bmatrix} 1 & 0 & 0 & 3 \\ 0 & 1 & 0 & 4 \\ 0 & 0 & 1 & 0 \\ 0 & 0 & 0 & 1 \end{bmatrix} = \begin{bmatrix} 1 & 0 & 0 & 3 \\ 0 & 0.866 & -0.500 & 4*0.866 \\ 0 & 0.500 & 0.866 & 4*0.5 \\ 0 & 0 & 0 & 1 \end{bmatrix}$$

Figure 3:
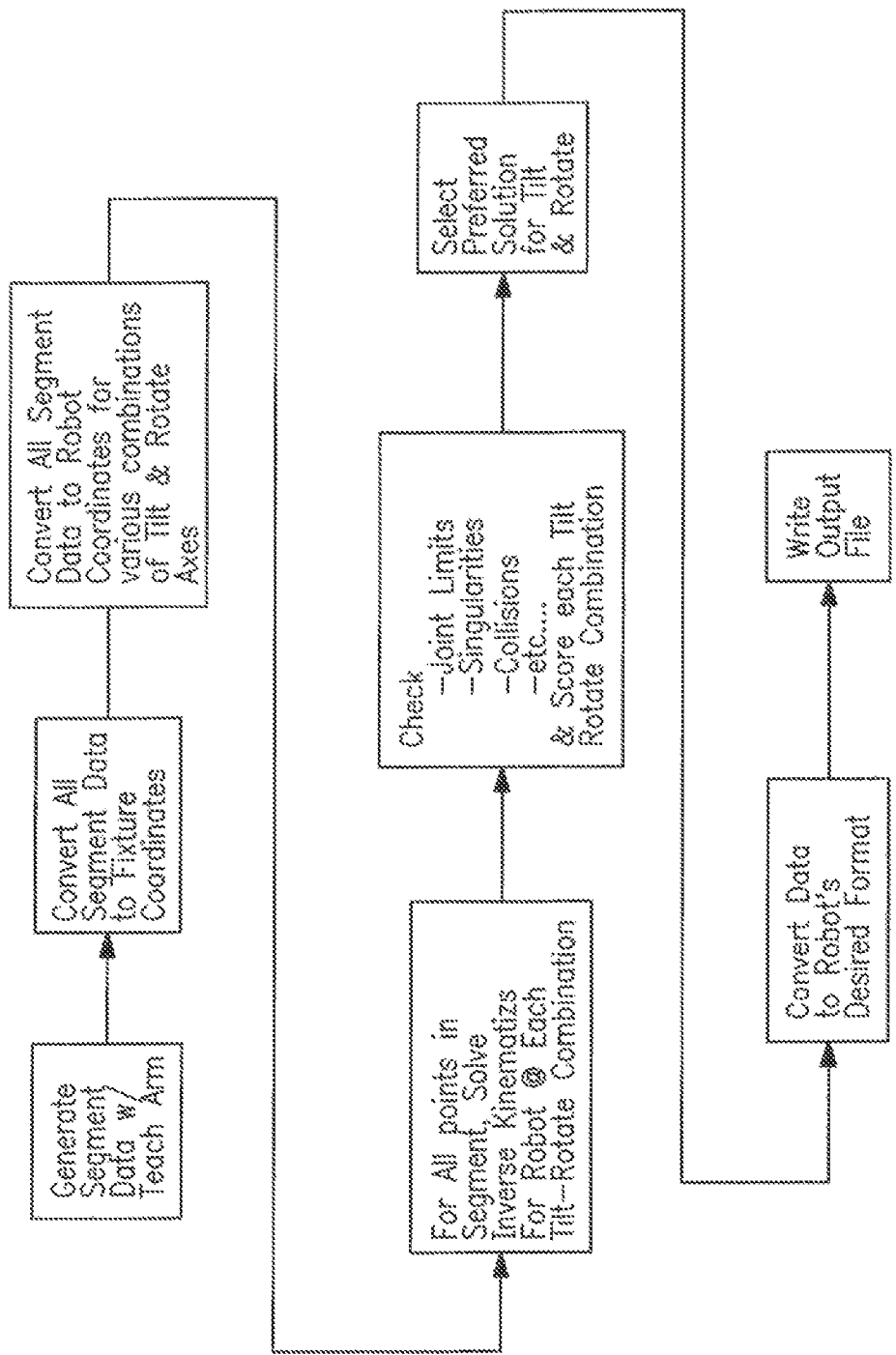
FIG. 3 illustrates routine generation details including raw path data, all path files, and routine structure.

Referring to FIG. 3, data generation can involve the following: generating segment data with a teach arm; converting all segment data to fixture coordinates; converting all segment data to robot coordinates for various combination of tilt and rotate axes; solving inverse kinematics for robot and each tilt/rotate combination for all points in the segment; checking (e.g., joint limits, singularities, collisions, etc.) and scoring each tilt/rotate combination; selecting a preferred solution for tilt/rotate; converting data to robot's desired format; and writing an output file.

In an embodiment, this invention includes a teaching/playback-type robot wherein the robot arm or teaching arm is moved and the path thereof is sampled in real time (operation instruction output time intervals) to perform the control of the path thereof. When path teaching is performed using this method, the number of data sampled will vary in accordance with the magnitude of the speed, and thus the overall number of samples will be compressed greatly, and at the time of the playback operation, the operation will be smooth notwithstanding the number of data points being small, and thus in practice this is superior as a method for performing smooth operation control with a small memory capacity. See, for example, Japanese Unexamined Patent Application Publication S61-208515, the disclosure of which is incorporated herein by reference.

In particular, this invention relates to a robot programming/controlling system that can drive an end effector through a series of desired path points along a desired path with respect to an application or workstation. The system includes a six degree of freedom (DOF) teaching arm or digitizing arm having a working end, an end effector model mounted to the working end, a workstation model (i.e., a teaching station), and a programming computer system. Teach arms or coordinate-measuring machine (CMM) arms are well known and commercially available, and commonly used in a wide variety of industrial applications. The working end can be manipulated to move the end effector model through a model path with respect to the workstation model or teaching station. At selected model path points, the teaching arm or digitizing arm generates model path point data representing the position and orientation of the end effector model with respect to the workstation model or teaching station.

The programming computer system includes a video monitor, a user interface, and memory for storing data including the model path point data, robot simulation and motion program generation software, and models of the robot, workstation and end effector. The simulation and motion program generation software is run as a function of the model path point data to generate motion-control program segments that direct the robot to drive the end effector through the desired path. The simulation and motion program generation software can also generate graphic images of the robot driving the end effector through the desired path. Interactively controlling the simulation and motion program generation software through the interface, and using visual feedback provided by the monitor, the user can perform collision and out-of-range checking and singularity point identification, and can optimize the motion-control program segments. See, for example, U.S. Pat. Nos. 5,880,956 and 5,495,410, the disclosures of which are incorporated herein by reference. In an embodiment of this invention, instead of relying on a user for detection, a computer can perform the above checking, identifying and optimizing.

A robot system can include a multi-axis manipulator such as robot which, under the control of a computer-based controller, drives an end effector along a desired path of motion with respect to an application or workstation. Robots are well known and commercially available, and commonly used in a wide variety of industrial applications. An end effector can be mounted to a wrist on the end of an arm assembly. The arm assembly can be driven about a waist axis, shoulder axis and elbow axis (i.e., three degrees of freedom) to position the end effector at desired positions within the operating range of the robot. The wrist can be driven about an x rotational axis, y rotational axis and z rotational axis (i.e., three degrees of freedom) to orient the faceplate of the wrist and therefore end effector at desired orientations within the operating range of robot. The position and orientation of the faceplate of the wrist at any desired path point can be described in terms of its position (p) and angle of rotation (θ) with respect to orthogonal x, y and z axes of a robot Cartesian coordinate system (i.e., $[p_x, p_y, p_z, \theta_x, \theta_y, \theta_z]_{robot}$). For purposes of convention, the center of the robot base can be designated the origin or reference point of the robot coordinate system.

The robot system can be configured for automated welding, painting, debarring, finishing and other operations on workpieces. In addition to the workpiece, the end effector therefore can include a jaw-type gripper for releasably grasping the workpiece. The position of any given point and surface of end effector can be described in terms of its position (p) and angle of rotation (θ) with respect to orthogonal x, y and z axes of an end effector Cartesian coordinate system (i.e., $[p_x, p_y, p_z, \theta_x, \theta_y, \theta_z]_{effector}$). The origin and orientation of the end effector coordinate system can be referenced to the faceplate of the robot wrist.

The application station or workstation can preferably include a thermal spray coating device mounted to a backstand. The position of any given point and surface on the application station, including the spray direction from which workpieces are coated, can be described in terms of its position (p) and angle of rotation (θ) with respect to orthogonal x, y and z axes of an application or workstation Cartesian coordinate system (i.e., $[p_x, p_y, p_z, \theta_x, \theta_y, \theta_z]_{workstation}$). The center of the application or workstation base can be designated as the origin of the application or workstation coordinate system.

A controller can be programmed with a drive program that is executed to effect the operation of the robot system. The drive program can include a motion-control program segment. The motion-control program segment can be a text file or binary file that can be directly read in by the robot and immediately executed. In response to the motion-control program segment, the controller can drive the robot and its end effector through a predetermined or desired path of motion with respect to the application or workstation. As the end effector is driven through the desired path of motion, the workpiece can be moved, for example, with respect to thermal spray device to coat the workpiece.

The motion-control program segment of the drive program can be synchronized, e.g., path-synchronized parameters can be controlled by the controller. For example, parameters that can be controlled in a synchronized manner with the motion of the robot include the actuation of a welder in robotic welding applications, and the actuation of a paint spray gun in robotic painting applications, and the like. Alternatively, the controller can execute programs controlling the position and orientation of a positioning table or device.

A programming system can include a workstation model or teaching station, end effector model, an encoder such as digitizing arm system and programming computer system. The end effector model can be used to simulate the actual end effector, but need not be a duplicate or complete replica of the actual end effector. However, the end effector model should simulate the surfaces of the actual workpiece that will be interacting with the application station or workstation during the operation of the robot system, and any other surfaces of the workpiece that may be of importance during the operation of the robot system. The end effector model can include a thermal spray device, and a workpiece model, which is a duplicate of the actual workpiece.

The workstation model or teaching station at the first location is used to simulate the actual application or workstation at the second location with which the robot system is being programmed to operate. Although it is not necessary for the workstation model or teaching station to be a duplicate, or even a complete replica of the actual workstation or application station, the workstation model should simulate the surfaces of the actual workstation that the workpiece will contact during the programming operation. Preferably, the workstation model or teaching station is a duplicate of the actual application station or workstation, and preferably includes a thermal spray device.

The workstation model (i.e., teaching station), end effector model, and workpiece model can preferably be a full-sized duplicate or replica, or partial duplicate or replica, of the actual workstation and workpiece. It is also within the scope of the invention for the workstation model, end effector model, and/or workpiece to be a complete or partial scale model. Preferably, each of the workstation model, workpiece model, and end effector model are of the same scale, although this is not required. The scale model can either be larger or smaller than the actual element. In such a case, the motion program generation software is programmed so as to account for the scale factor when generating robot motion program control segments for the actual workstation (i.e., application station), end effector, and workpiece based on model path point date generated by the encoder on the scale models.

The fixture plate of the workstation model can include a replica of the workpiece. The replica can be a scale model of the intended workpiece. The motion program processor executes the robot simulation and motion program generation software as a function of the model point data obtained from the scale model of the workpiece to generate robot motion-control program segments for causing the robot simulation to drive the end effector simulation through the desired path of motion with respect to the actual desired path of motion in the application station.

The teach arm system or digitizing arm system can include a six degree of freedom arm that is interfaced to an arm computer. One end of an arm can be mounted to a base, and the other end of the arm can include a working end with finger actuated control switches. The end effector model can be mounted to a faceplate on a working end. When grasped at the working end, the arm is easily movable about a first axis, a second axis, and a third axis (representing three degrees of freedom) to position the faceplate of the working end and therefore end effector model at desired positions within the operating range of the arm.

The working end can also be easily moved about an x rotational axis, y rotational axis and z rotational axis to orient the working end faceplate and the end effector model at desired orientations within the operating range of the arm. The position and orientation of the faceplate of the working end at any desired point can be described in terms of its position (p) and angle of rotation (θ) with respect to orthogonal x, y and z axes of an arm Cartesian coordinate system (i.e., $[p_x, p_y, p_z, \theta_x, \theta_y, \theta_z]_{arm}$). For purposes of convention, the arm base can be designated the origin of the arm coordinate system. As used herein, "teach arm" means any coordinate-measuring machine (CMM) arm useful for measuring physical characteristics of an object, that may be manually controlled by an operator or computer controlled.

The position of any given point and surface on the end effector model, including the surfaces of the workpiece model, can be described in terms of its position (p) and angle of rotation (θ) with respect to orthogonal x, y and z axes of an end effector model Cartesian coordinate system (i.e., $[p_x, p_y, p_z, \theta_x, \theta_y, \theta_z]_{effector\ model}$). The origin and orientation of the end effector model coordinate system can be referenced to a predetermined point and orientation on the faceplate of the working end.

The teach arm or digitizing arm includes sensors that provide angle position signals to a computer representative of the angular positions of the arm sections about each of the axes. The computer includes a position computation program that mathematically relates the angular positions of the arm sections and the arm kinematics (including the length of the arm sections) to the actual position and orientation of the faceplate of the working end in the arm coordinate system. In response to the actuation of control switches, the arm computer executes the position computation program as a function of the angle position signals to compute the position and orientation of the faceplate of the working end (i.e., $[p_x, p_y, p_z, \theta_x, \theta_y, \theta_z]_{arm}$) at the then-current position of the end effector. Although the position computation program can be executed by a separate arm computer, the programming computer system can be programmed to perform this function in other embodiments.

With regard to the teaching station, the position of any given point and surface on the teaching station, including for example the spray direction from which workpieces are coated, can be described in terms of its position (p) and angle of rotation ($\theta$) with respect to orthogonal x, y and z axes of an application or workstation Cartesian coordinate system (i.e., $[p_x, p_y, p_z, \theta_x, \theta_y, \theta_z]_{teach\ station}$). The center of the teaching station base can be designated as the origin of the teaching station coordinate system.

The teach arm system can be used by a technician to generate model path points representative of the position and orientation of the end effector model with respect to the workstation model or teaching station. To perform this programming operation, the technician can grasp the working end, and manipulates the working end to move the end effector model through a model path of motion with respect to the workstation model. The model path of motion is a path that corresponds to or replicates the desired path of motion of robot end effector with respect to the actual workstation or application station.

In an embodiment, a technician can manipulate the working end to move the workpiece model through a model path of motion with respect to a thermal spray model. While the end effector model is being moved through the model path of motion, the technician can actuate control switches to cause the arm computer to "digitize" the positions of the end effector model at discreet model path points along the model path of motion. The arm computer generates model path point data representative of the position and orientation of the end effector model at each of the model path points $[p_x, p_y, p_z, \theta_x, \theta_y, \theta_z]_{arm}$.

In the programming system, control switches can be actuated in a manner causing the arm computer to generate the model path point data either continuously or at specific model path points as the end effector model is moved through the model path of motion. In particular, one of the control switches can be depressed to cause the arm computer to periodically sample and generate the model path point data. Another of the control switches can be depressed each time it is desired to have the arm computer generate model path point data for a desired model path point. During this model path point sampling operation it is necessary to obtain a sufficient number of model path points to enable the programming computer system to generate a motion-control program segment that will cause the robot to drive end effector through the path of motion with the desired accuracy and speed. The model path point data generated by arm computer is transmitted to and stored in the programming computer system.

The programming computer system can include data memory, program memory, and video display means, e.g., a video monitor, and interface, all of which are interfaced to a processor. The interface will typically include both a keyboard and mouse that are used by the technician to interface with the programming computer system in a conventional manner. Commercially available PC platforms can be capable of functioning as the processor. The monitor can be any commercially available display monitor capable of generating text or graphics images of the desired quality or both. When the system is used to drive the robot, the processor includes an optional output port for communicating the robot motion-control program segments to the robot. The robot at the second location can be coupled to the output port of the programmable computer for receiving the robot motion-control segments. In an embodiment, the robot motion-control program is a text file or binary file that can be directly read in by the robot and immediately executed.

The executable simulation software run by the processor during the operation of the teach programming system is stored in the memory. The computing functions performed by the simulation software can include graphics generation, motion-control program segment generation, force-control program segment generation, drive program assembly, collision checking, out-of-range checking and calibration. Data used by the processor in the course of executing the simulation software, and data generated by the execution of the simulation software, is stored in the data memory. Examples of the data stored in the memory include robot model data, workstation model (i.e., teaching station) data, end effector model data, model path points, model force points, the motion-control program segment, the force-control program segment, the drive program and calibration information.

The robot model data stored in the memory includes data representative of the kinematics, three dimensional (3D) physical shell and other characteristics and features of the robot used by the simulation software. This data is referenced to the robot coordinate system, and includes a mathematical description of all pertinent aspects of the robot with which the programming system is used. Also included in the robot model data is data characterizing a graphical representation of the robot, and can be used to generate 3D graphic displays of the robot on the monitor. The degree to which the robot model data accurately characterizes the robot and its graphical image (i.e., the accuracy of the model) will depend upon a variety of factors including the sophistication of the simulation software, the capabilities of the processor and the degree of accuracy and functions desired from the operation of the programming system. For example, if collision checking functions need not be performed to a high degree of accuracy, a simple geometric model of the physical shell of the robot will typically suffice, and enable the collision checking function to be performed more quickly.

The end effector model data includes data representative of the 3D physical shell of the end effector mounted to the robot. This data is referenced to the end effector reference system, and includes a mathematical description of all pertinent aspects of the end effector used on the robot. Also included in the end effector model data is data characterizing a graphical representation of the end effector, and can be used to generate 3D graphic displays of the end effector on the monitor. Again, the accuracy of the end effector model will depend on a variety of factors including the nature of the application of the programming system. For example, a model of the workpiece is not needed for the operation of the programming system, but is useful for the collision checking and visualization functions.

The workstation model or teaching station data includes data representative of the 3D physical shell of the workstation, and can also include other pertinent features of the workcell surrounding the workstation. This data is referenced to the application or workstation reference system, and includes a mathematical description of all pertinent aspects of the application or workstation with which the robot is used. Also included in the workstation model or teaching station data is data characterizing a graphical representation of the workstation, and can be used to generate 3D graphic displays of the workstation on the monitor. The accuracy of the workstation model or teaching station can vary depending on the functional requirements of the application of the programming system.

The model path points generated by the arm computer while the end effector model is moved through the model path of motion are stored in the data memory for subsequent processing by the simulation software. Data representative of the motion-control program segments generated by the processor while executing the simulation software can also be stored in the data memory before these programs are combined or assembled into the drive programs and downloaded to the robot system.

At the teaching station, the robot programming method involves programming a robot simulation to drive the end effector model through a series of model path points along a model path of motion with respect to the teaching station. The model path points and model path of motion correspond to desired path points and a desired path of motion at the application station. An encoder is provided for furnishing model path point data representative of the position and orientation of the end effector model with respect to the teaching station at each of the model path points as the end effector model is moved through the model path of motion. The encoder can include a digitizing arm coupled to the end effector model. The encoder defines an encoder kinematics.

An electronic memory is used for storing data. The electronic memory includes simulation software memory for storing robot simulation and motion program generation software for a robot simulation defining a robot kinematics; model path point memory for storing the model path point data; and motion program memory for storing robot motion-control program segments. The electronic memory can also include robot model memory for storing robot model data; and range checking memory for storing robot out-of-range checking software. The electronic memory can further include workstation model or teaching station memory for storing workstation model or teaching station data; robot model memory for storing robot model data; end effector model memory for storing end effector model data; and collision checking memory for storing robot collision checking software. The electronic memory can also include calibration memory for storing calibration data representative of the relative positions of the end effector model, robot and application station. The robot kinematics can be the same as or different from the encoder kinematics.

A programmable computer can be used that is coupled to the encoder and to the electronic memory. The programmable computer can include a motion program processor for executing the robot simulation and motion program generation software as a function of the model path point data to generate robot motion-control program segments for causing the robot to drive the end effector through the desired path of motion, and for storing the robot motion-control program segments in the motion program memory.

The programmable computer can include out-of-range processor for executing the out-of-range checking software as a function of the robot model data and the model path point data, for generating out-of-range determination data representative of whether the robot can drive the end effector through the desired path of motion represented by the motion-control program segments. The programmable computer can also include a collision processor for executing the collision checking software as a function of the workstation model or teaching station data, robot model data, end effector model data and the model path point data, for generating collision determination data representative of whether the robot can drive the end effector through the desired path of motion represented by the motion-control program segments free from collisions with the application station or workstation. The programmable computer can further include the motion program processor for executing the robot simulation and motion program generation software as a function of the model path point data and the calibration data to generate robot motion-control program segments for causing the robot simulation to drive the end effector through the desired path of motion.

A video displayer coupled to the programmable computer can be used in the method of this invention. The programmable computer can include a video processor for executing the robot simulation and motion program generation software as a function of the model path point data and causing the video displayer to generate a graphic display of the robot driving the end effector through the desired path of motion.

A technician-actuated interface can be coupled to the programmable computer. Such an interface will enable interaction with the robot simulation and motion program generation software through visual feedback from the graphic display. The interface will also enable optimization of the motion-control program segments.

The method of this invention also involves programming the robot and a parameter-controllable device driven through a desired path-synchronized parameter regime as the end effector is driven through the desired path of motion. The system further includes a parameter sensor for providing model parameter point data representative of a model parameter regime as the end effector model is moved through the model path of motion. The model parameter regime corresponds to the desired parameter regime. For such a system, the electronic memory would further include model parameter point memory for storing the model parameter point data; parameter program software memory for storing parameter-control program segment generation software; and parameter regime memory for storing parameter-control program segments. The programmable computer would further include a parameter program processor for executing the parameter-control program segment generation software as a function of the model parameter point data to generate parameter-control program segments for causing the parameter-controllable device to be driven through the desired parameter regime with respect to the end effector path of motion, and for storing the parameter-control program segments in the parameter regime memory.

The model path points generated by the teach arm or digitizing arm system are referenced to the robot coordinate system. For the simulation software to generate the motion-control program segments from the model path points, the software must translate the model path points to corresponding points in the robot coordinate system. Calibration data relating the robot coordinate system to the teach arm coordinate system, the robot coordinate system to the workstation coordinate system, the teach arm coordinate system to the teach station coordinate system, and the teach station coordinate system to the workstation coordinate system is stored in the data memory and used for the calibration function. Unless the end effector model is identical to the actual end effector and identically located on the working end and the robot wrist, respectively, the calibration data will also include data describing the position and orientation of the end effector model in the end effector model coordinate system and the actual end effector in the end effector coordinate system.

The teach arm or digitizing arm system, the teaching station and the programming computer system can be used in conjunction with the robot system, the application station or workstation and an end effector calibration stand to generate the needed calibration data during a programming system set-up procedure. A calibrated pointer can be mounted on the working end when using the arm system during the set-up procedure, while a calibrated pointer can be mounted to the robot wrist. During the set-up procedure, the relative positions and orientations of the teach arm, teaching station, robot and workstation coordinate systems can be located through the use of known or predetermined nonlinear calibration points within the coordinate systems. Calibration information may also be empirically determined. The programming computer system can calculate the calibration information data as a function of the known calibration information data.

By way of example, if the teaching station coordinate system is used as a reference, the technician can move the working end to touch three nonlinear and predetermined teaching station calibration points on the teaching station with the pointer. Control switches are actuated to cause the teach arm computer to generate data representative of the position of the pointer at each of the three workstation calibration points. The programming computer system is programmed to know the location of the three teaching station calibration points within the teaching station coordinate system, and with this information can generate calibration data describing the position and orientation of the teaching station coordinate system with respect to the teach arm coordinate system.

Using a conventional control interface, the technician can then move the robot arm and touch the same three workstation calibration points with the pointer. When the pointer is positioned at the workstation calibration points, the robot controller is "queried" by the programming computer system to determine the position of the pointer at the workstation calibration points. Because the location of the three workstation calibration points within the workstation coordinate system are known, and the position of the pointer at each of the calibration points determined, the programming computer system can generate calibration information data describing the position and orientation of the workstation coordinate system with respect to the robot coordinate system. Using the calibration information data describing the relationship between the teach arm and teaching station coordinate systems, and between the workstation and robot coordinate systems, the programming computer system can generate calibration information data describing the relationship between the teach arm coordinate system and the robot coordinate system.

Calibration information data describing the position and orientation of the end effector within the robot coordinate system can be determined using the teach arm system. With the end effector mounted to the robot wrist, the technician can move the working end and touch pointer to three nonlinear and predetermined robot calibration points on the robot (e.g., on the robot wrist), and three nonlinear and predetermined end effector calibration points on the end effector. Control switches are actuated to cause the teach arm computer to generate data representative of the position of the pointer at each of the three robot calibration points and the three end effector calibration points. The programming computer system is programmed to know where each of the three robot calibration points are with respect to the robot reference system, and where each of the three end effector calibration points are with respect to the end effector reference system. With this information, the programming computer system can generate calibration information data describing the position and orientation of the end effector in the robot reference system.

Similarly, the position and orientation of the end effector model in the teach arm reference system can be determined using the teach arm system and calibration stand. The calibration stand includes an end effector model mounting system (e.g., a position-indexed socket) that simulates (e.g., has the same design as) the end effector mounting system on the working end. The calibration stand also includes three nonlinear stand calibration points that are positioned with respect to the mounting system of the stand in a known manner. Calibration data representative of the relationship between the stand calibration points and the stand mounting system is stored in the memory. The relationship between the stand calibration points and the stand mounting system can, for example, be measured or provided by the manufacturer.

With the end effector model positioned in the mounting system of the calibration stand, the technician will move the working end and touch the pointer to the three stand calibration points, and actuate switches to generate data representative of the position of the three stand calibration points in the teach arm reference system. Because the relationship between the stand calibration points and the stand mounting system is known, the programming computer system can use this information to determine the position of the mounting system in the teach arm coordinate system.

The technician then moves the working end and touches three end effector model calibration points on the end effector model. The control switches are actuated to cause the teach arm computer to generate data representative of the position of the pointer at each of the three end effector model calibration points. The programming computer system is programmed to know where the three end effector model calibration points are in the end effector model reference system. With this information, the programming computer system can generate calibration information data describing the position of the end effector model in the teach arm reference system. Other methods for generating the calibration information data necessary for applications of the programming system will be readily apparent to those skilled in the art.

When it is desired to generate a motion-control program, a processor executes the calibration software stored in the memory (if needed) as a function of the model path points and the calibration information data stored in the data memory. The execution of the calibration software in this manner results in the generation of translated model path points referenced to the robot coordinate system. Using the translated model path points as input data, the processor can execute the conventional motion-control program segment generation software stored in the memory to generate motion-control program segments that will cause the robot to drive the end effector through a desired path of motion corresponding to the model path of motion. Motion-control program segments generated in this manner can be temporarily stored in the data memory.

Using the robot, workstation and end effector model data stored in the data memory, a processor can execute software performing the collision checking and out-of-range checking functions, and also do singularity checking and joint speed checking.

The collision checking function uses the robot, workstation and end effector model data (or desired subsets thereof), and determines whether the modeled portions of the robot and/or the end effector would collide or touch the modeled portions of the workstation as the robot drives the end effector through the path of motion represented by the motion-control program segments. If any collisions or near misses are identified, the software performing the collision checking function can generate textual messages on the monitor or other controller display describing the nature of the collisions. Alternatively, or in addition to the textual messages, embodiments of the programming computer system including simulated graphics capability can highlight the portions of the graphical image of the robot, the end effector and/or the workstation involved in the identified collision to provide a visual description of the nature of the collision.

The out-of-range checking function uses the robot model data describing the robot kinematics to determine if the robot is physically capable of driving the end effector through the path of motion represented by the motion-control program segments (i.e., whether the desired path of motion is within the robot operating range). Textual messages describing any out-of-range conditions identified through the execution of the out-of-range checking software can be displayed on the monitor or other controller display. Alternatively, or in addition to the textual messages, embodiments of the programming system including simulated graphics capability can highlight the portions of the graphical image of the robot involved in the identified out-of-range condition to provide a visual description of the nature of the condition.

The singularity checking function uses the robot model data describing the robot kinematics to determine the joint angles required throughout the program segment. Certain combinations of joint angles indicate a singularity, a condition that should be avoided.

The joint speed checking function uses the robot model data describing the robot kinematics to determine the joint angles required at each point throughout the program segment. With short and known time intervals between positions in the program segment, an estimate of the speed of each joint between points can be made and compared against the limit of the manipulator.

The programming computer system can also be programmed to perform a number of model path point and model force point data manipulation functions. For example, mathematical curve fitting and filtering algorithms can be used to process the model path point and/or model force point data before the data is processed by the motion-control program segment generation software to optimize the motion paths. The number of model path points processed to generate the motion-control program segments can be selectively reduced using mathematical algorithms, thereby increasing the efficiency by which the program segments can be generated and executed.

The robot programming system offers considerable advantages. Through the use of an end effector model and an encoder such as a teach arm or digitizing arm, a technician can easily and accurately lead the end effector model through a model path corresponding to the desired path of motion. The system is flexible and not restricted to use with any particular type of robot, or other multi-axis manipulator. The teach arm or digitizing arm is capable of accurately generating model path point data representative of the position and orientation of the end effector model at selected points on the desired path of motion. With the model path point data inputted to the programming system computer in this manner, motion-control program segments capable of accurately driving the robot and its end effector through the desired path of motion can be conveniently, quickly and efficiently generated.

Additionally, the system can be used to define path data for the workpiece and end effector relative to a workstation. This path data can later be calibrated to a desired robot, or can be used to help determine the desired location and orientation of the robot relative to the workstation.

The robot programming system of this invention may also be used with plural workstations. For example, the present programming system could be used to program a robot to perform certain operations relative to a workpiece at each of several different workstations. Collision checking and out-of-range checking functions can be performed with respect to each of the various workstations.

In an embodiment, this invention relates to a robot programming method for thermal spray coating a workpiece. The method involves, at a first location (i.e., a teaching station), preparing teach data to teach motions to a robot for thermal spray coating the workpiece. The teach data comprises at least one of robot position data elements and at least one of robot motion pattern data elements. At a second location (i.e., an application station different from the teaching station), communicating the teach data to the robot and programming the robot in accordance with the teach data for thermal spray coating the workpiece.

In another embodiment, this invention relates to a robot programming system. The system includes, at a first location (i.e., a teaching station), a teach arm and a table having a fixture plate, wherein teach data is prepared to teach motions to a robot to drive an end effector through a series of desired path points along a desired path of motion with respect to an application station. The teach data comprises at least one of robot position data elements and at least one of robot motion pattern data elements. At a second location (i.e., the application station different from the teaching station, a robot and a device having a fixture plate. The teach data is communicated to the robot and the robot is programmed in accordance with the teach data to drive the end effector through the series of desired path points along the desired path of motion with respect to the application station.

In yet another embodiment, this invention relates to a robot programming system for thermal spray coating a workpiece. The system includes, at a first location (i.e., a teaching station), a teach arm and a table having a fixture plate, wherein teach data is prepared to teach motions to a robot for thermal spray coating the workpiece. The teach data comprises at least one of robot position data elements and at least one of robot motion pattern data elements. At a second location (i.e., an application station different from the teaching station), a robot and a device having a fixture plate. The teach data is communicated to the robot and the robot is programmed in accordance with the teach data for thermal spray coating the workpiece.

Although this invention has been described with reference to preferred embodiments, those skilled in the art will recognize that changes can be made in form and detail without departing from the spirit and scope of the invention. For example, although the invention is described with reference to a robot system in which the workpiece is a part being finished and moved with respect to the thermal spray workstation (i.e., tool), this motion is relative and the end effector can include the tool while the workstation includes the fixed workpiece. Furthermore, because relative paths of motion and path-synchronized parameters are obtained using the programming system, the reference frames in which the motion is reproduced by the robot can be easily reversed. For example, although the end effector model is moved during the programming operation with respect to a fixed workstation during both programming and robot operation in an embodiment described above, the model path point data obtained during the programming operation can be used to generate motion-control program segments causing the robot to drive the "workstation" through the same relative path of motion with respect to a positionally fixed "end effector". In addition, although described with reference to a programming computer system that is separate from the robot controller, all the functions performed by the programming computer system can be performed by the controller if the controller has the necessary computing power capabilities.

This invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of this invention should not be limited to the exact details and structures described herein, but rather by the structures described by the language of the claims, and the equivalents of those structures.

The invention claimed is:

1. A robot programming method comprising:
   at a first location comprising a teaching station, preparing teach data to teach motions to a robot to drive an end effector through a series of desired path points along a desired path of motion with respect to an application station, said teach data comprising at least one of robot position data elements and at least one of robot motion pattern data elements;
   at a second location comprising said application station, said second location being different from said first location, communicating said teach data to said robot and programming said robot in accordance with said teach data to drive said end effector through said series of desired path points along said desired path of motion with respect to said application station;
   at said teaching station, programming a robot simulation to drive an end effector model through a series of model path points along a model path of motion with respect to said teaching station, the model path points and model path of motion corresponding to desired path points and a desired path of motion; and
   at said first location:
   moving an end effector model through a series of model path points along a model path of motion with respect to the teaching station, the model path points and model path of motion corresponding to desired path points and a desired path of motion;
   providing an encoder for furnishing model path point data representative of the position and orientation of the end effector model with respect to the teaching station at each of the model path points as the end effector model is moved through the model path of motion, the encoder defining an encoder kinematics;
   providing an electronic memory for storing data, including:
   simulation software memory for storing robot simulation and motion program generation software for a robot simulation defining a robot kinematics;
   model path point memory for storing the model path point data; and
   motion program memory for storing robot motion-control program segments; and
   providing a programmable computer coupled to the encoder and to the electronic memory, including:
   a motion program processor for executing the robot simulation and motion program generation software as a function of the model path point data to generate robot motion-control program segments for causing the robot to drive the end effector through the desired path of motion, and for storing the robot motion-control program segments in the motion program memory.

2. The robot programming method of claim 1 which comprises simulating thermal spray coating a workpiece at said first location and thermal spray coating said workpiece at said second location.

3. The robot programming method of claim 1 wherein said teaching station comprises a teach arm and a table having a fixture plate and said fixture plate can be rotated about one or more axes.

4. The robot programming method of claim 3 wherein said teach arm is used to detect one or more features on said teaching station fixture plate and to determine rotation angle of said teaching station fixture plate.

5. The robot programming method of claim 3 wherein said application station comprises a robot and a device having a fixture plate that can be tilted and/or rotated.

6. The robot programming method of claim 5 wherein an algorithm is used to solve for application station fixture plate tilt and/or rotation angles.

7. The robot programming method of claim 5 wherein said teaching station fixture plate and said application station fixture plate are the same.

8. The robot programming method of claim 5 wherein said teach data comprises one or more routines for driving said end effector through said series of desired path points along said desired path of motion with respect to said application station.

9. The robot programming method of claim 8 wherein said routines comprise one or more chapters in which data is recorded in segments for playback at a fixed application station fixture plate tilt and/or rotation angle.

10. The robot programming method of claim 9 wherein each chapter can have a different application station fixture plate tilt and/or rotation angle.

11. The robot programming method of claim 9 wherein data is recorded in said chapters for playback with speed scaling.

12. The robot programming method of claim 1 wherein said teach data is generated by a method selected from Mimic, Point Select and Auto Raster.

13. A robot programming system comprising:
   at a first location comprising a teaching station, a teach arm and a table having a fixture plate, wherein teach data is prepared to teach motions to a robot to drive an end effector through a series of desired path points along a desired path of motion with respect to an application station, said teach data comprising at least one of robot position data elements and at least one of robot motion pattern data elements;

at a second location comprising said application station, said second location being different from said first location, a robot and a device having a fixture plate, wherein said teach data is communicated to said robot and said robot is programmed in accordance with said teach data to drive said end effector through said series of desired path points along said desired path of motion with respect to said application station;

at said teaching station, a programmed robot simulation to drive an end effector model through a series of model path points along a model path of motion with respect to said teaching station, the model path points and model path of motion corresponding to desired path points and a desired path of motion; and at said first location:

an end effector model that moves through a series of model path points along a model path of motion with respect to the teaching station, the model path points and model path of motion corresponding to desired path points and a desired path of motion;

an encoder for furnishing model path point data representative of the position and orientation of the end effector model with respect to the teaching station at each of the model path points as the end effector model is moved through the model path of motion, the encoder defining an encoder kinematics;

an electronic memory for storing data, including:

simulation software memory for storing robot simulation and motion program generation software for a robot simulation defining a robot kinematics;

model path point memory for storing the model path point data; and motion program memory for storing robot motion-control program segments; and a programmable computer coupled to the encoder and to the electronic memory, including:

a motion program processor for executing the robot simulation and motion program generation software as a function of the model path point data to generate robot motion-control program segments for causing the robot to drive the end effector through the desired path of motion, and for storing the robot motion-control program segments in the motion program memory.

14. A robot programming system for thermal spray coating a workpiece, said system comprising:

at a first location comprising a teaching station, a teach arm and a table having a fixture plate, wherein teach data is prepared to teach motions to a robot for thermal spray coating said workpiece, said teach data comprising at least one of robot position data elements and at least one of robot motion pattern data elements;

at a second location comprising an application station, said second location being different from said first location, a robot and a device having a fixture plate, wherein said teach data is communicated to said robot and said robot is programmed in accordance with said teach data for thermal spray coating said workpiece;

at said teaching station, a programmed robot simulation to drive an end effector model through a series of model path points along a model path of motion with respect to said teaching station, the model path points and model path of motion corresponding to desired path points and a desired path of motion; and at said first location:

an end effector model that moves through a series of model path points along a model path of motion with respect to the teaching station, the model path points and model path of motion corresponding to desired path points and a desired path of motion;

an encoder for furnishing model path point data representative of the position and orientation of the end effector model with respect to the teaching station at each of the model path points as the end effector model is moved through the model path of motion, the encoder defining an encoder kinematics;

an electronic memory for storing data, including:

simulation software memory for storing robot simulation and motion program generation software for a robot simulation defining a robot kinematics;

model path point memory for storing the model path point data; and motion program memory for storing robot motion-control program segments; and a programmable computer coupled to the encoder and to the electronic memory, including:

a motion program processor for executing the robot simulation and motion program generation software as a function of the model path point data to generate robot motion-control program segments for causing the robot to drive the end effector through the desired path of motion, and for storing the robot motion-control program segments in the motion program memory.

* * * * *